(12) United States Patent
Khan et al.

(10) Patent No.: US 12,358,473 B2
(45) Date of Patent: Jul. 15, 2025

(54) MOTOR-DRIVEN TRAILER AND TOWBAR SYSTEM

(71) Applicant: NÜWIEL GmbH, Hamburg (DE)

(72) Inventors: Fahad Aman Khan, Hamburg (DE); Muhammad Ali Qammar, Hamburg (DE)

(73) Assignee: NÜWIEL GMBH, Hamburg (DE)

( * ) Notice: Subject to any disclaimer, the term of this patent is extended or adjusted under 35 U.S.C. 154(b) by 333 days.

(21) Appl. No.: 18/026,645

(22) PCT Filed: Aug. 19, 2021

(86) PCT No.: PCT/EP2021/073047
§ 371 (c)(1),
(2) Date: Mar. 16, 2023

(87) PCT Pub. No.: WO2022/058119
PCT Pub. Date: Mar. 24, 2022

(65) Prior Publication Data
US 2023/0339440 A1    Oct. 26, 2023

(30) Foreign Application Priority Data
Sep. 17, 2020   (EP) .................... 20196699

(51) Int. Cl.
*B60T 7/20* (2006.01)
*B60K 31/00* (2006.01)
(Continued)

(52) U.S. Cl.
CPC .............. *B60T 7/20* (2013.01); *B60K 31/00* (2013.01); *B60T 8/1706* (2013.01); *B60T 8/171* (2013.01);
(Continued)

(58) Field of Classification Search
CPC .......... B60T 7/20; B60T 8/1706; B60T 8/171; B60T 8/1708; B60K 31/00;
(Continued)

(56) References Cited

U.S. PATENT DOCUMENTS 4,475,612 A    10/1984  Anderson
12,116,059 B2 * 10/2024 Heseding .............. B60T 13/662
(Continued)

FOREIGN PATENT DOCUMENTS

DE    202011004585 U1    8/2012
DE    102016102847 A1    8/2017
(Continued)

OTHER PUBLICATIONS

Sykora, C.F. Trailer Sway Control Using an Active Hitch, Google Scholar, University of Waterloo, Aug. 2017, pp. 1-98. (Year: 2017).*
(Continued)

*Primary Examiner* — Russell Frejd
(74) *Attorney, Agent, or Firm* — Barclay Damon LLP

(57) ABSTRACT

A motor-driven trailer and towbar system includes a towbar having a vehicle side end configured to connect with the vehicle and a trailer side end configured to connect with a trailer coupling. The towbar is pivotably coupled to the trailer and configured to pivot along a pivoting path (P) between a lowered position (L) and a raised position (R) with respect to the trailer. At least one first sensor element is configured to detect a position of the towbar along the pivoting path (P). A control unit (TCU) is in communication with the at least one first sensor element and is configured to switch the system between an operating mode and a parking mode. The system is switched into the parking mode when the towbar is in a raised position (R) and is switched into the operating mode when the towbar is in a lowered position (L).

15 Claims, 7 Drawing Sheets

(51) Int. Cl.
  *B60L 50/60* (2019.01)
  *B60T 8/17* (2006.01)
  *B60T 8/171* (2006.01)
  *B62B 5/00* (2006.01)
  *B62B 5/04* (2006.01)
  *B62D 59/04* (2006.01)
  *B62K 27/00* (2006.01)
  *B62K 27/12* (2006.01)

(52) U.S. Cl.
  CPC ............ *B62B 5/004* (2013.01); *B62B 5/0069* (2013.01); *B62B 5/0404* (2013.01); *B62D 59/04* (2013.01); *B62K 27/003* (2013.01); *B62K 27/12* (2013.01); *B60K 2031/0091* (2013.01); *B60L 50/60* (2019.02); *B60L 2200/28* (2013.01)

(58) Field of Classification Search
  CPC ............ B60K 2031/0091; B62B 5/004; B62B 5/0069; B62B 5/0404; B62D 59/04; B62D 63/064; B62K 27/003; B62K 27/12; B60L 50/60; B60L 50/20; B60L 2200/28; Y02T 90/16; B62L 3/00; B62M 6/40
  See application file for complete search history.

(56) References Cited

U.S. PATENT DOCUMENTS

| | | | | |
|---|---|---|---|---|
| 2016/0075315 | A1* | 3/2016 | Luomaranta | B60T 8/1708 701/70 |
| 2017/0282870 | A1* | 10/2017 | Meade | B60T 8/1708 |
| 2020/0377094 | A1* | 12/2020 | Rabbiosi | B60L 7/18 |
| 2021/0031770 | A1* | 2/2021 | Knorr | B60W 10/18 |
| 2021/0309194 | A1* | 10/2021 | Thomas | B60D 1/26 |

FOREIGN PATENT DOCUMENTS

| | | | |
|---|---|---|---|
| EP | 3416860 A1 | 12/2018 | |
| GB | 2560883 A | 10/2018 | |
| RU | 2050299 C1 | 12/1995 | |
| WO | 2018/065988 A1 | 4/2018 | |
| WO | 2018/172755 A1 | 9/2018 | |
| WO | WO-2020051619 A1 * | 3/2020 | ............ B60T 7/20 |

OTHER PUBLICATIONS

PCT/EP2021/073047; filed Aug. 19, 2021; International Search Report and Written Opinion; Date of Mailing Nov. 5, 2021 (9 pages).

PCT/EP2021/073047; filed Aug. 19, 2021; English translation of International Preliminary Report on Patentability; Date of Mailing Mar. 21, 2023 (6 pages).

* cited by examiner

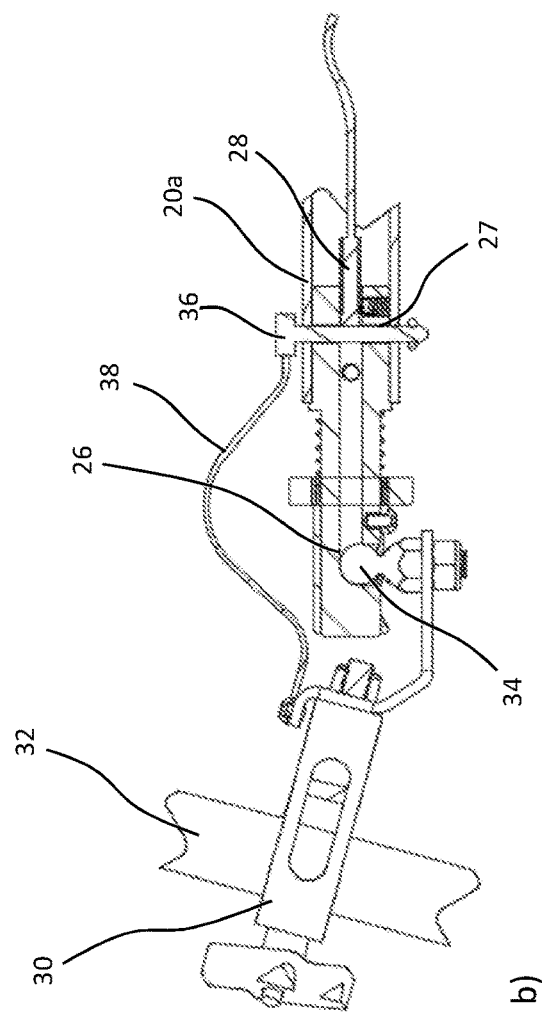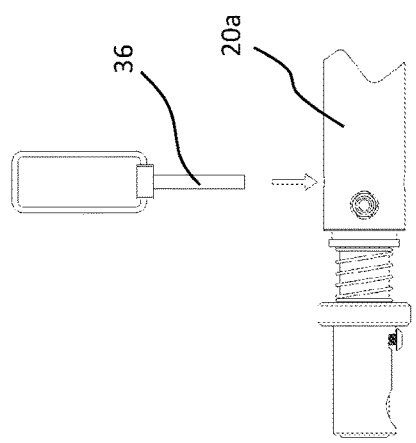
Fig. 4

MOTOR-DRIVEN TRAILER AND TOWBAR SYSTEM

CROSS REFERENCE TO RELATED INVENTION

This application is a national stage application pursuant to 35 U.S.C. § 371 of International Application No. PCT/EP2021/073047, filed on Aug. 19, 2021, which claims priority to, and benefit of, European Patent Application No. 20196699.1, filed Sep. 17, 2020, the entire contents of which are hereby incorporated by reference.

TECHNOLOGICAL FIELD

The invention pertains to a motor-driven trailer and towbar system for coupling the trailer to a vehicle, in particular to a bicycle.

BACKGROUND

Motor-driven trailers are self-propelled by a motor which is usually powered by a battery. Such motor-driven trailers may be designed to automatically follow the vehicle they are coupled to via the towbar, in particular they may accelerate when the towing vehicle accelerates or they may apply brakes when the towing vehicle applies brakes. In this way a distance between the motor-driven trailer and the vehicle may be measured and maintained within a specified range by accelerating or decelerating the trailer. Such towbar and trailers are known for example from EP 3 416 860 B1 and GB 256 0883 A.

It may be advantageous to allow for the motor-driven trailer to be moved also when not connected to a vehicle. The trailer may for example be pushed or pulled via a person having the towbar in hand. Generally, during such use of the motor-driven trailer in a handcart mode, the trailer may follow the person in the same manner as explained above by holding constant a distance between the trailer and the person.

Independent of the use of the trailer it is important to securely prevent unintended movement of the trailer, in particular when parked.

It is therefore an object of the invention to provide for a motor-driven trailer and towbar system which is particularly safe to use.

BRIEF SUMMARY OF THE INVENTION

An embodiment of a motor-driven trailer and towbar system for coupling the trailer to a vehicle, in particular to a bicycle, the towbar comprises a vehicle side end for connection with the vehicle and a trailer side end connected with a trailer coupling of the trailer, wherein the towbar is coupled to the trailer such that the towbar is pivotable along a pivoting path between a lowered position and a raised position with respect to the trailer, wherein the system comprises at least one first sensor element for detecting a position of the towbar along the pivoting path and a control unit communicating with the at least one first sensor element, wherein the control unit is adapted to, dependent on the position of the towbar along the pivoting path, put the system in an operating mode where the motor of the trailer supports the movement of the trailer and in a parking mode where brakes of the trailer are applied to impede movement of the trailer, wherein the system is put into the parking mode when the towbar is in the raised position and into the operating mode when the towbar is in the lowered position.

In an embodiment of the system, the towbar is pivotable with respect to the trailer. The towbar may be pivoted upwards from a lowered position into a raised position or downwards from the raised position into the lowered position. The lowered position may, for example, be a basically horizontal orientation of the towbar and the raised position may, for example, be a basically vertical arrangement of the towbar. The lowered position and/or the raised position may be defined by a specific angular position of the towbar with respect to the trailer, but may also be understood as angular ranges of the towbar with respect to the trailer. For example, an angular range of +/−10 to 20° around the horizontal orientation of the towbar may be understood as the lowered position. The towbar not being in the raised position may be considered as the towbar being in the lowered position and therefore the system being in the operating mode.

According to the invention the towbar comprises at least one first sensor element that is adapted to detect a position of the towbar relative to the trailer along the pivoting path, in particular to detect an angular position of the towbar. The data measured by the sensor element is received by the control unit which puts the system in different modes depending on the position of the towbar. The control unit may be part of the trailer and/or the towbar. Preferably, the control unit is part of a trailer control unit which controls further functions of the trailer, in particular the movement of the trailer depending on the distance of the trailer and a vehicle connected to the trailer via the towbar or a person holding the towbar. According to the invention the control unit can put the system either in an operating mode or in a parking mode dependent on the position of the towbar. In the operating mode the motor of the motor-driven trailer is activated to support the movement of the trailer in the way explained above. In particular, the trailer may be moved such that a distance between the vehicle or person pulling or pushing the trailer is maintained constant. Thus, if the distance between the vehicle or the person and the trailer increases, the motor may accelerate the trailer and, if a distance between the vehicle or person and the trailer decreases, the motor may move the trailer in reverse and/or brakes may be applied. In this operating mode the towbar is in the lowered position and is coupled to a vehicle or is held by a person.

In the raised position, on the other hand, the trailer is put into the parking mode via the control unit so that the brakes of the trailer are applied to impede further movement of the trailer. In the parking mode the motor may be deactivated so as to no longer support any movement of the trailer. Thus, movement of the trailer is safely impeded, when the towbar is in the raised position. The brakes being applied and possibly the motor being deactivated therefore leads to a higher level of safety when using the motor-driven trailer as no unwanted movement can occur.

According to an embodiment the system is further structured to detect a movement direction of the towbar along the pivoting path, wherein the control unit is structured to apply brakes of the trailer when the towbar moves upwards towards the raised position. In particular, the at least one first sensor and/or the control unit may be adapted to detect the movement direction of the towbar. According to this embodiment it is not only detected whether the towbar is in the lowered position or the raised position, but also whether the towbar moves upwards or downwards along the pivoting path. Brakes of the trailer are applied not only when the towbar reaches the raised position, but already when the towbar leaves the lowered position moving upwards towards the raised position. According to a respective embodiment the control unit is adapted to increase the braking force of the brakes with the towbar approaching the raised position. Thus, the closer the towbar comes to the raised position the higher the braking force may be. This embodiment allows for quickly reacting to the towbar leaving the lowered position in the upward direction and for gently stopping the trailer. The movement direction of the towbar upwards or downwards may be detected via the sensor providing different outputs for these two movement directions. Further sensors may be provided in this regard as will be explained later on.

According to an embodiment, the control unit is further structured to put the system into an emergency mode where brakes of the trailer are applied at full braking force to achieve an emergency braking, wherein the system is put into the emergency mode when the towbar moves downwards from the lowered position along the pivoting path. According to this embodiment the control unit is structured to put the system in a further mode: the emergency mode. This is done with the towbar moving not upwards starting from the lowered position, but downwards. As soon as the towbar leaves the lowered position in its downward movement, brakes of the trailer are applied at full force. By applying full braking force an emergency braking is achieved and the motor-driven trailer comes to a stop as soon as possible. The towbar moving downwards from the lowered position, thereby leaving the operating mode, usually means that an accident has occurred. For example, a bicyclist riding the bicycle coupled to the trailer via the towbar may have had an accident or person pulling the towbar may have let go of the towbar. In this case, it is important to stop the trailer to prevent collision with the user. According to a respective embodiment the system is put into the emergency mode when the towbar moves downwards from the lowered position along the pivoting path with a movement speed higher than or equal to a set speed limit. According to this embodiment emergency braking only occurs if the towbar moves downwards with a minimum speed or higher. The speed limit may be set such that emergency braking is performed only when the towbar is falling down, but not if the towbar is put down gently by the user.

According to an embodiment, the first sensor element comprises one or more of the following: a proximity sensor, an angular sensor, and angular encoder, a switch, in particular a magnetic switch. In general, the first sensor element may comprise a first sensor and a counterpart, wherein the sensor may be arranged at the towbar and the counterpart at the trailer or wherein the sensor may be arranged at the trailer and the counterpart at the towbar. The proximity sensor may detect a distance and/or a change in distance between the sensor and the counterpart. The angular sensor or the angular encoder may give an angular position as an output. The first sensor element may, however, also be represented by a switch which is activated when the towbar reaches the raised position. The switch being activated then leads to the control unit activating the parking mode and therefore the brakes. The switch not being activated and therefore the towbar not being in the raised position may be considered in accordance with the invention as the towbar being in the lowered position and therefore the system being in the operating mode.

In an embodiment, the first sensor element comprises a proximity sensor and a counterpart, the proximity sensor detecting a distance between the proximity sensor and the counterpart. The proximity sensor may be arranged at the trailer side end of the towbar and the counterpart opposite the proximity sensor at the trailer coupling of the trailer, or alternatively the counterpart may be arranged at the trailer side end of the towbar and the proximity sensor opposite the counterpart at the trailer coupling of the trailer. The proximity sensor detects the distance and/or a change in the distance between the proximity sensor and the counterpart. Depending on the distance or the change of the distance it may be derived whether the towbar is in the raised position or in the lowered position so that either the operating mode or the parking mode may be applied. Also, a movement direction of the towbar may be detected via such a sensor element. Further, such a sensor allows for the explained emergency mode to be applied, i.e. for detecting whether the towbar moves downwards from the lowered position and at what speed.

According to an embodiment, at least two first sensor elements for detecting the position of the towbar along the pivoting path are provided. Both of the two first sensor elements may be configured as explained above. Providing two first sensor elements leads to an even higher level of safety due to redundancy. Should one of the sensor elements fail, the other one may still work. Also, providing at least two first sensor elements may allow for the movement direction of the towbar to be determined. According to a respective embodiment the at least two first sensor elements provide different sensor outputs when the towbar moves along the pivoting path. In particular, they provide different sensor outputs when the towbar moves upwards or downwards along the pivoting path.

According to an embodiment, the trailer further comprises at least one second sensor element for detecting whether a connection of the vehicle side end of the towbar with the vehicle has been established. The at least one second sensor element is preferably arranged at the vehicle side end of the towbar. The at least one second sensor element can detect whether the towbar is connected with the vehicle or not. For example, it can be detected via the second sensor element if the towbar is connected to a trailer hitch or a trailer coupling of a car or bicycle. Depending on whether such a connection is detected or not, the control unit puts the system in different modes.

According to a respective embodiment, the control unit is structured to put the system into a handcart mode, if the at least one second sensor element does not detect a connection to a vehicle, wherein in the handcart mode the control unit limits the maximum speed of the trailer to a first speed limit. Thus, if the trailer is not connected to a vehicle it can be used as a handcart being pulled by a person holding the towbar. Limiting the maximum speed of the trailer in the handcart mode improves safety. Also, according to a further respective embodiment the control unit may be adapted to put the system into a vehicle mode if the at least one second sensor element detects a connection to a vehicle, wherein in the vehicle mode the control unit limits the maximum speed of the trailer to a second speed limit. The second speed limit may be higher than the first speed limit. Thus, depending on whether a connection to a vehicle is detected or not the system may be limited to different speed limits. In particular, the first speed limit as a lower speed limit is set so that the trailer moves relatively slow. For example, the first speed limit may be walking speed. This increases safety. To adhere to the set speed limits the control unit may limit the support given by the motor and/or may apply brakes. The second speed limit may be a maximum speed of the trailer.

According to an embodiment, the at least one second sensor element detects whether a safety pin of a vehicle coupling of the vehicle is inserted into a respective receptacle of the vehicle side end of the towbar. The at least one second sensor detecting the safety pin may be interpreted as the trailer being connected to a vehicle. Also, the control unit may be structured to control the motor and therefore the movement of the trailer in a different manner if a connection to a vehicle is detected than if no such connection is detected, in particular by putting the system into the vehicle mode. For example, a control algorithm executed on the control unit to control the movement of the trailer may be changed in vehicle mode to achieve a more agile movement. Automatic activation of the vehicle mode would also remove the need for the user to switch the system into vehicle mode manually, e.g. by pressing a button, which the user might forget to do. Also, the second sensor element may detect whether the safety pin is correctly installed or not, e.g. if the safety pin is inserted fully into the receptacle.

According to an embodiment, the control unit is further structured to put the system into an emergency mode where brakes of the trailer are applied at full braking force to achieve an emergency braking, wherein the system is put into the emergency mode when the connection between the towbar and the vehicle is lost. This emergency mode is activated if a connection between the towbar and the vehicle, which was once established, is lost for some reason. In particular, the safety pin leaving the respective receptacle during operation of the trailer, as detected by the at least one second sensor element, may be interpreted as such an unwanted connection loss. This may appear, for example, if the driver of the vehicle has an accident. For example, if the bicyclist falls to the ground.

BRIEF DESCRIPTION OF THE DRAWINGS

An embodiment of the invention will be explained in the following with respect to the figures.

FIG. 3a shows a sectional side view of an embodiment of a connection between a trailer coupling of the trailer and a trailer side end of the towbar.

FIG. 3b shows a top view if the embodiment of FIG. 3a.

FIG. 4a shows an embodiment of a vehicle side end of the towbar and a connection of the vehicle side end of the towbar to the vehicle.

FIG. 4b shows an embodiment of the vehicle side end of the towbar and the connection of the vehicle side end of the towbar to the vehicle.

In the following the same reference signs indicate the same objects unless stated otherwise.

DETAILED DESCRIPTION OF THE INVENTION

Figure 1:
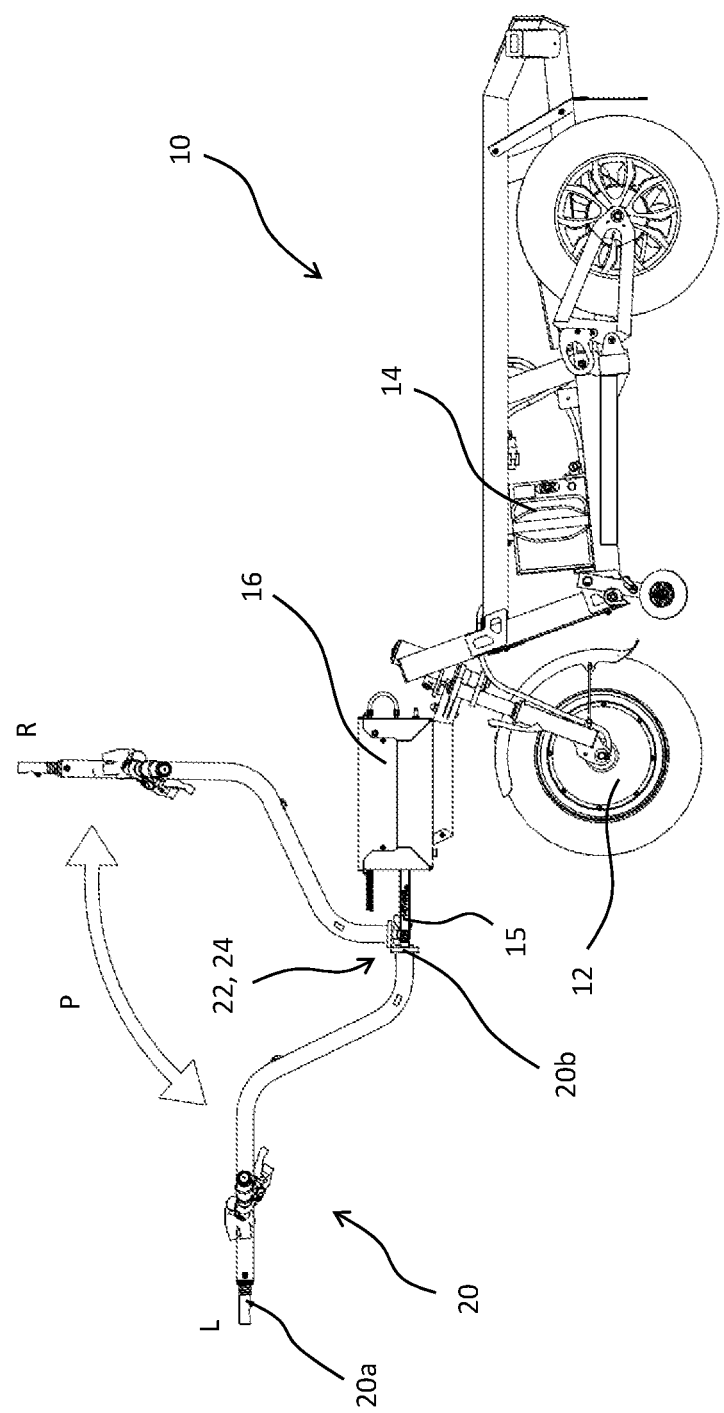
FIG. 1 shows side view if an embodiment of a motor-driven trailer and towbar system where the towbar is in a lowered position as well as in a raised position.

FIG. 1 shows a system of a motor-driven trailer 10 and a towbar 20 for coupling the trailer 10 to a vehicle. The trailer 10 comprises a motor 12 powered by a battery 14. In this embodiment the motor 12 is arranged at a front axle driving the front wheel. The motor 12 may however be arranged generally anywhere at the trailer 10 and may also be structured to drive one or more of the rear wheels. The trailer 10 comprises a trailer control unit which is not shown in FIG. 1. The trailer control unit, called TCU in the following, may control a movement of the trailer 10. The trailer 10 is self-propelled via the motor 12 such that a distance between the trailer 10 and the towbar 20, and therefore between the trailer 10 and a vehicle 32 (FIG. 6) or a person 40 (FIG. 5) pulling or pushing the trailer 10 via the towbar 20, can be detected and can be held constant. This allows for the trailer 10 to follow the vehicle 32 (FIG. 6) or person 40 (FIG. 5) in a seemingly weightless manner. To achieve this, a control box 16 is provided which allows for said distance measurement, wherein in particular a variable distance between the towbar 20 and the trailer 10 may be measured and held constant as is explained in detail in EP 3 416 860 B1.

The towbar 20 comprises a vehicle side end 20a for connection with a bicycle as a vehicle and a trailer side end 20b connected with the trailer 10 via the control box 16. The towbar 20 is coupled to the trailer 10 such that the towbar 20 is pivotable along a pivoting path P between a lowered position L and a raised position R. With the towbar 20 in the lowered position L the system may be connected to a bicycle or it may be pulled by a person holding the towbar 20. In the raised position R the system is not in use and is in a parking mode as will be explained in the following.

Figure 2:
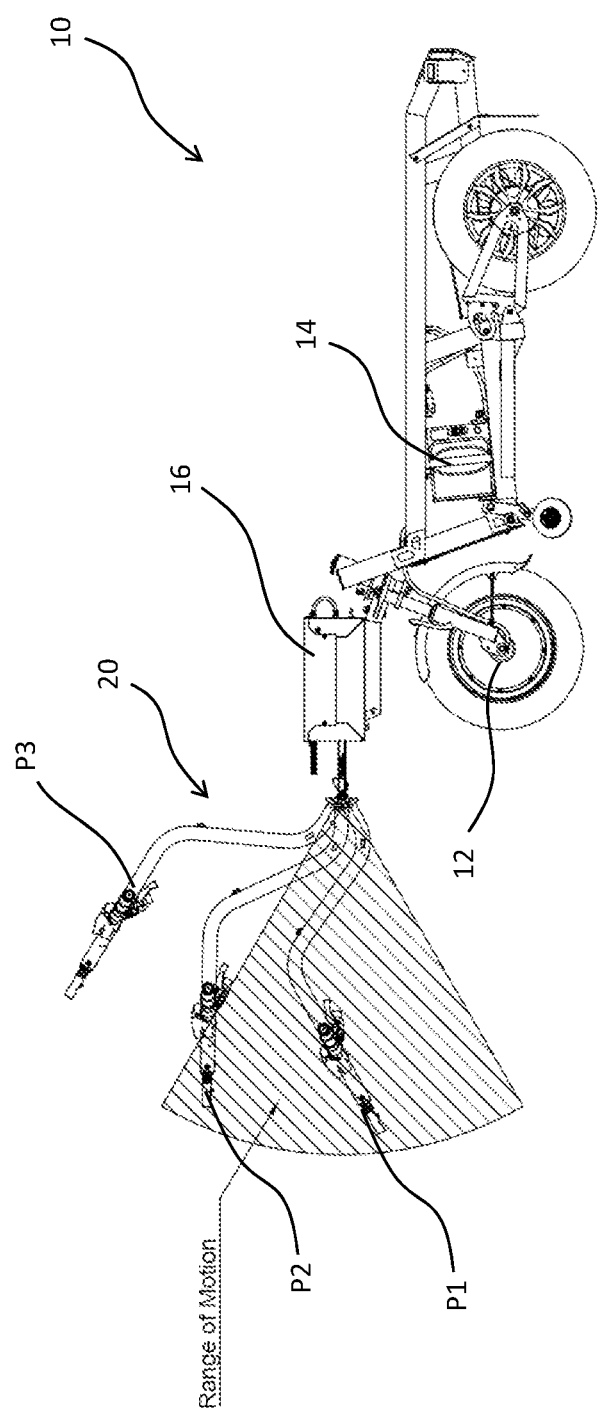
FIG. 2 shows the embodiment of FIG. 1 showing a range of motion the towbar has in the lowered position.

The lowered position L and the raised position R may be understood as angular values along the pivoting path P. However, they may also be understood as angular ranges along the pivoting path P as can be seen in FIG. 2, where a range of motion of the towbar 20 along the pivoting path P may be understood as the lowered position of the towbar 20. As long as the towbar 20 is within this angular range of motion of approximately 30° around a horizontal orientation of the towbar 20 in this embodiment, the towbar 20 is in the lowered position L. This comprises in particular positions P1 and P2. Position P3 shows the towbar 20 being raised above the lowered position in the direction of the raised position R.

Figure 3:
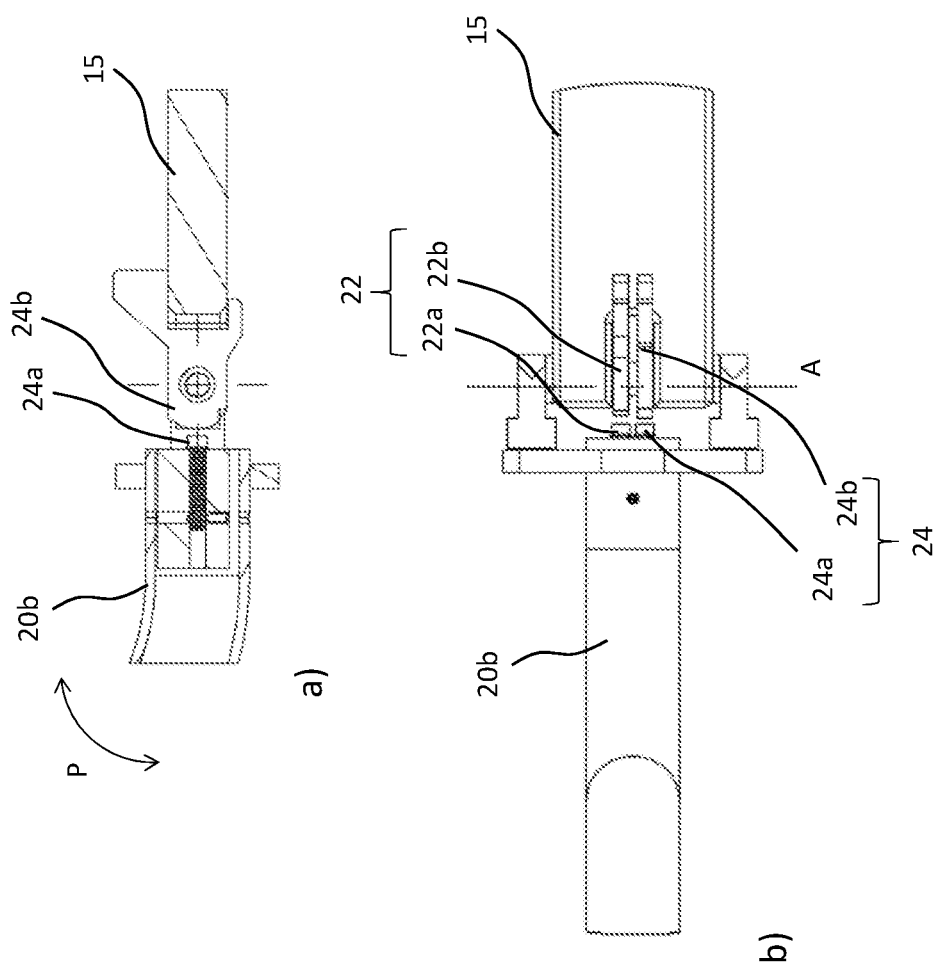

The system according to the invention comprises two first sensor elements 22, 24, which can be seen in FIGS. 3a and 3b. The sensor elements 22, 24 are arranged at the connection between the towbar 20 and the trailer 10. Both first sensor elements 22, 24 each comprise a proximity sensor 22a, 24a arranged at the trailer side end 20b of towbar 20 and a counterpart 22b, 24b arranged at the trailer coupling 15 of the trailer 10. The towbar 20 is pivotable around an axis A with respect to the trailer coupling 15 of the trailer 10. In FIG. 3a this coupling is shown in a sectional side view so that only the first sensor element 24 can be seen. In FIG. 3b a top view of the coupling is shown so that both of the first sensor elements 22, 24 can be seen. The proximity sensor 22a detects a distance between the proximity sensor 22a and the counterpart 22b, while the proximity sensor 24a detects a distance between the proximity sensor 24a and the counterpart 24b. The counterparts 22b, 24b are of different shape as can be seen in FIGS. 3a and 3b. Due to the different shape of the counterparts 22b, 24b the proximity sensors 22a, 24a measure different distances for respective angular positions of the towbar 20 along the pivoting path P around axis A. Thus, the two first sensor elements 22, 24 provide different sensor outputs when the towbar 20 moves along the pivoting path. The counterparts 22b, 24b may be ferromagnetic elements and the proximity sensors 22a, 24a may measure a magnetic property of these ferromagnetic counterparts 22b, 24b. Via the two first sensor elements 22, 24, an angular position of the towbar 20 along the pivoting path P may be determined.

According to the invention the system comprises a control unit, which may be part of the TCU 100 (FIG. 7), that is structured to put the system in different modes depending on the position of the towbar 20 along pivoting path P. In particular, the control unit 100 (FIG. 7) is structured to put the system in an operating mode where the motor 12 of the trailer 10 supports the movement of the trailer 10 and in a parking mode where brakes of the trailer are applied to impede movement of the trailer 10. When the towbar 20 is in the lowered position L, the control unit 100 (FIG. 7) puts the system into the operating mode, while when the towbar 20 is in the raised position R, the control unit 100 (FIG. 7) puts the system into the parking mode. The position of the towbar 20 is detected by the two first sensor elements 22, 24. The two first sensor elements 22, 24 are also structured to provide a movement direction of the towbar 20 along the pivoting path P due to the different sensor outputs. Thanks to this, the control unit 100 (FIG. 7) may apply brakes of the trailer 10 not only when the towbar 20 reaches the raised position R, but already when the towbar 20 moves upwards. In particular, a braking force of the brakes may be increased with the towbar 20 approaching the raised position R.

Thus, the system according to the invention enables differentiation between an operating mode and a braking mode. In the operating mode the towbar 20 and therefore the trailer 10 may be connected to a vehicle 32 (FIG. 6) or may be pulled by a person 40 (FIG. 5), the motor 12 of the trailer 10 in the operating mode being activated to support the movement of the trailer 10. In the parking mode, however, the trailer 10 is stopped by applying brakes. Also, in the parking mode the motor 12 of the trailer may be deactivated so as to no longer support the movement of the trailer 10. In the parking mode the trailer 10 is therefore safely stopped.

In FIGS. 4a and 4b, the connection of the towbar 20 and therefore the trailer 10 to a bicycle 32 is shown schematically. In particular, the vehicle side end 20a of the towbar 20 comprises a first receptacle 26 which receives a trailer hitch 34 of a bicycle coupling 30 being coupled to a bar of a bicycle 32. At the vehicle side end 20a of the towbar 20 a second sensor element 28 is provided for detecting whether a connection of the vehicle side end 20a of the towbar 20 with the bicycle 32 has been established. The second sensor element 28 detects whether a safety pin 36 is inserted into a respective second receptacle 27.

If the second sensor element 28 detects the pin 36 and therefore the connection to the bicycle 32, the control unit 100 (FIG. 7) puts the system into a vehicle mode, wherein in the vehicle mode the control unit 100 (FIG. 7) limits the maximum speed of the trailer 10 to a second speed limit. If the second sensor element 28 does not detect the pin 36 it is assumed that no safe connection to the bicycle 32 is established and the control unit 100 (FIG. 7) puts the system into a handcart mode, wherein in the handcart mode the control unit 100 (FIG. 7) limits the maximum speed of the trailer 10 to a first speed limit. The second speed limit is higher than the first speed limit. Thus, with such a second sensor element 28 the system may differentiate between a handcart mode where a person may want to pull the trailer 10 by gripping the towbar 20 and a vehicle mode where the trailer 10 is pulled by a bicycle 32. Setting a lower speed limit for the handcart mode improves safety. In particular, because the trailer 10 can only be moved at highest speed if the safety pin 36 is received in the second receptacle 27. This way it is indicated to the user whether the safety pin 36 is inserted or not. The safety pin 36 is secured to the coupling 30 via a leash 38. The second sensor element 28 may, however, also or alternatively detect whether the trailer hitch 34 is inserted into the first receptacle 26.

Furthermore, the control unit 100 (FIG. 7) may also be structured to put the system into an emergency mode where brakes of the trailer are applied at full braking force to achieve an emergency braking. The control unit 100 (FIG. 7) may put the system into the emergency mode for example if the towbar 20 moves downwards along the pivoting path P from the lowered position L, in particular if such downward movement occurs with a speed higher than or equal to a set speed limit. Thus, the towbar 20 falling down unintentionally leads to a stop of the trailer 10. Also, the emergency mode may be set and therefore emergency braking activated when the connection between the towbar 20 and the bicycle 32 is lost, for example if the second sensor element 28 no longer detects the safety pin 36.

Figure 5:
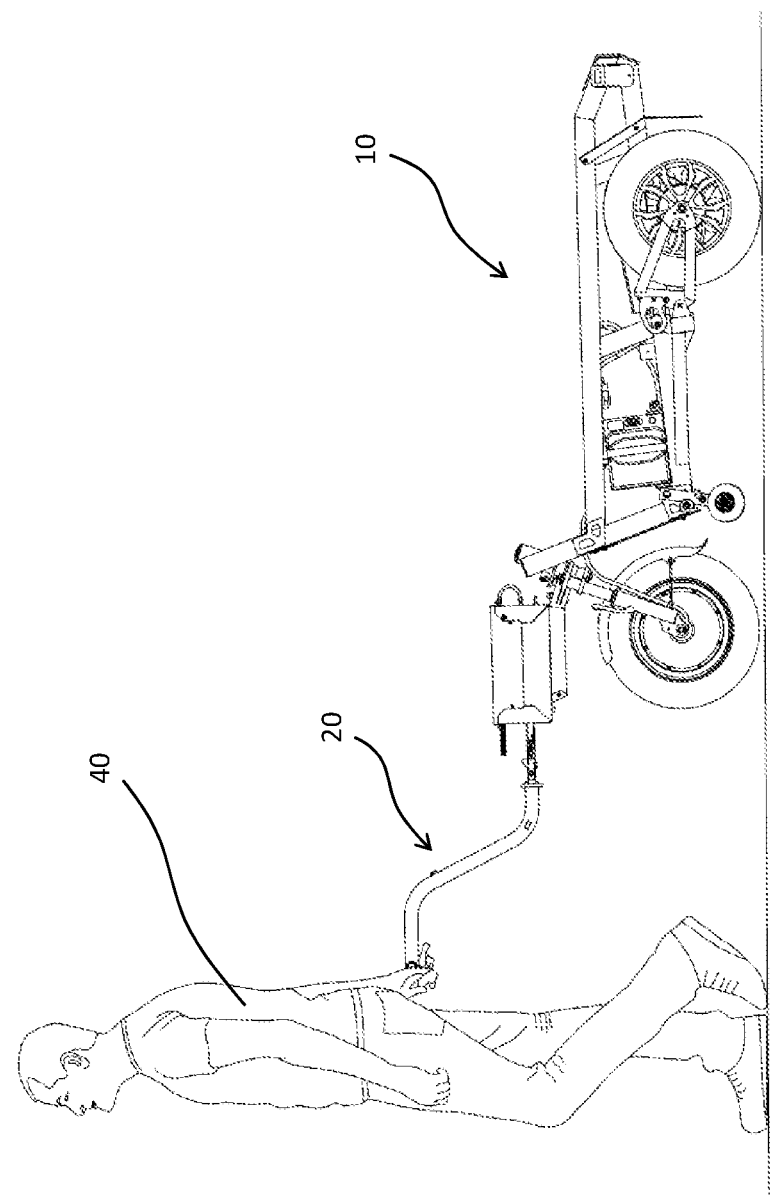
FIG. 5 shows a side view of an embodiment of the system operated in a handcart mode.

In FIG. 5 the system is shown in the handcart mode, where it is pulled by a person 40. As mentioned, the control unit 100 (FIG. 7) may put the system into the handcart mode thereby limiting a maximum speed of the trailer 10, for example by applying brakes and/or by limiting the support given by the motor 12 of the trailer 10. If the user 40 is incapacitated or if the trailer 10 is being pulled by a child, the towbar 20 will fall down or will be below the lowered position, respectively, so that emergency braking is done.

Figure 6:
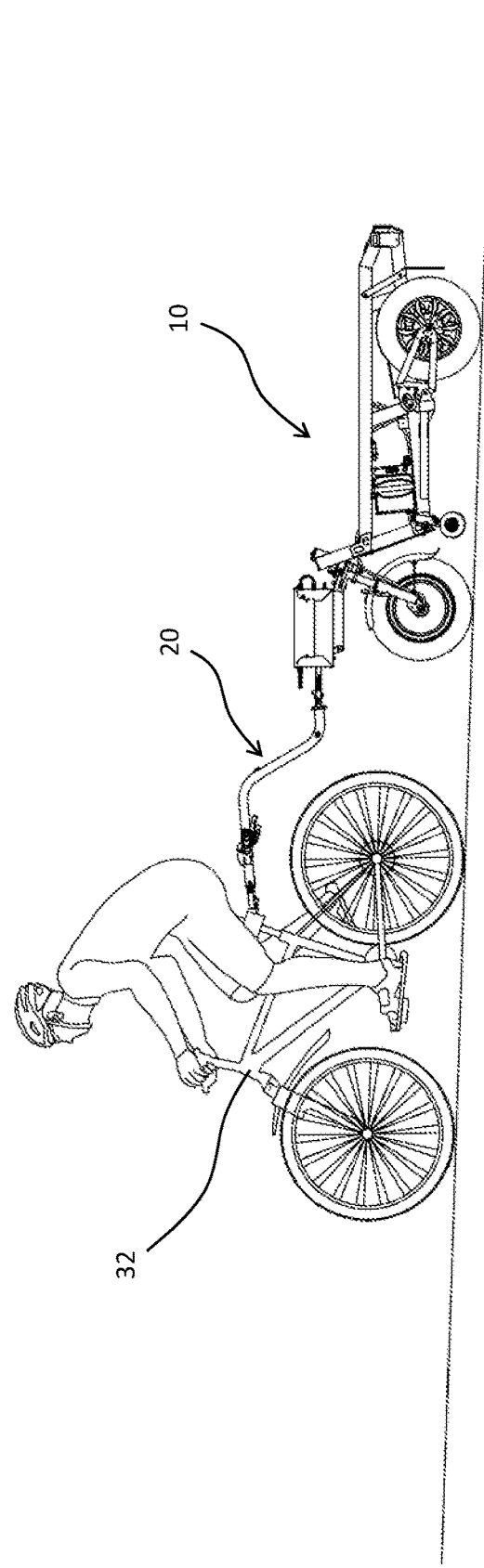
FIG. 6 shows a side view if an embodiment of the system coupled to a bicycle operated in a vehicle mode.

In FIG. 6 the system is shown coupled to a bicycle 32. Here the system is in the operating mode as the towbar 20 is in the lowered position as detected by the first sensor elements 22, 24. The second sensor element 28 detects the connection between the towbar 20 and the bicycle 32 so that the system is put into the vehicle mode setting a higher speed limit. In particular, in the vehicle mode a maximum speed of the trailer 10 may be set as a speed limit. Also, in the vehicle mode the control unit 100 (FIG. 7) may configure the control of the motor 12 such that it is more agile.

Figure 7:
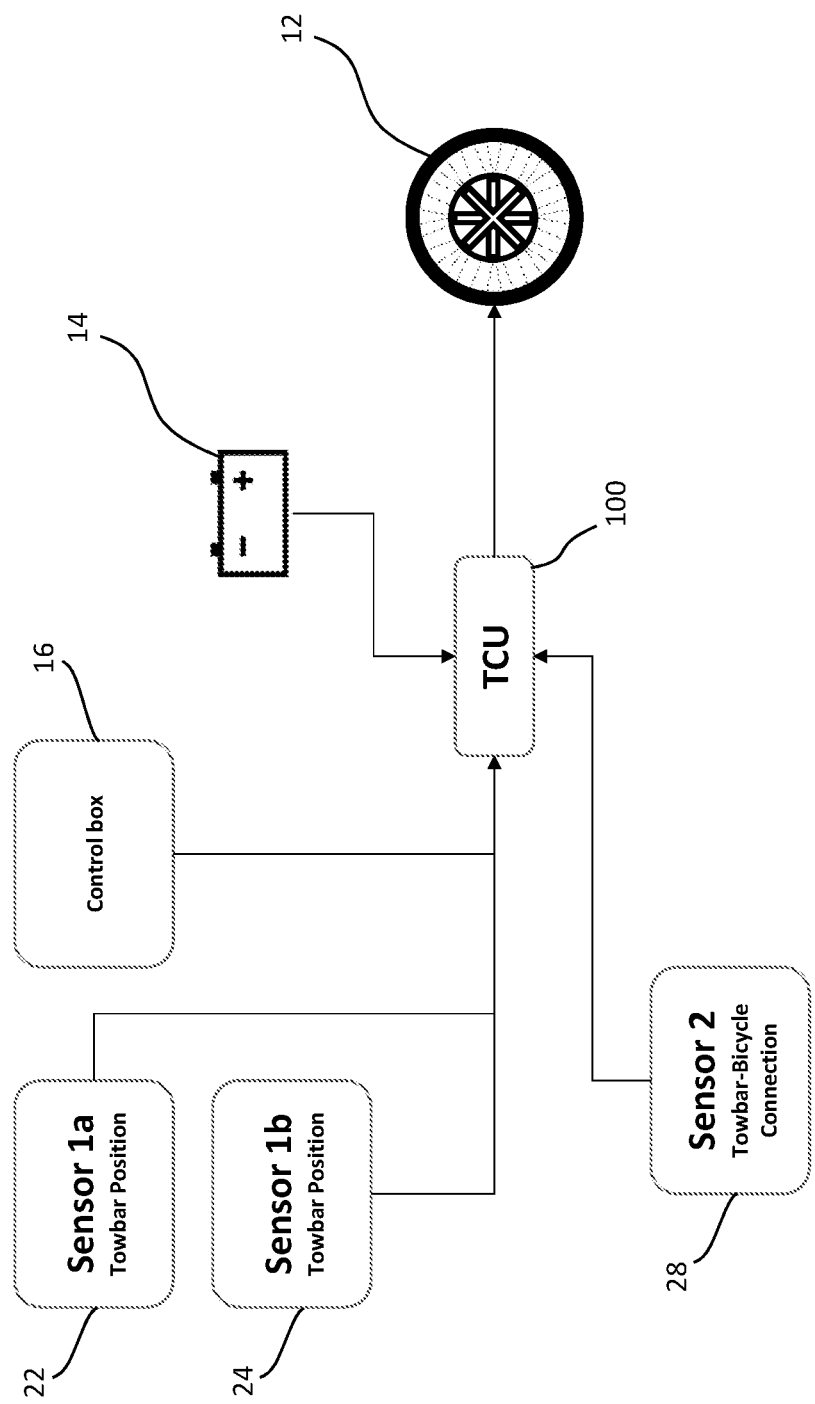
FIG. 7 schematically shows examples of inputs and outputs of a control unit.

In FIG. 7 it is shown schematically what inputs the TCU 100 is receiving. The control unit in accordance with the invention may be part of the TCU, as mentioned above. The TCU 100 receives inputs from both first sensor elements 22, 24 pertaining to the towbar position. Also, the TCU 100 receives an input from the second sensor element 28 indicating the towbar bicycle connection and inputs from the control box 16 regarding the distance between the vehicle 32 or the user and the trailer 10. The battery 14 serves as an electrical supply for the TCU 100. The TCU 100 controls the motor 12 based on these inputs and also controls the application of brakes.

LIST OF REFERENCE NUMERALS 10 trailer
12 motor
14 battery
15 trailer coupling
16 control box
20 towbar
20a vehicle side end of towbar
20b trailer side end of towbar
22, 24 first sensor elements
22a, 24a proximity sensors
22b, 24b counterparts
26 first receptacle
27 second receptacle
28 second sensor element
30 bicycle coupling 32 bicycle
34 trailer hitch
36 safety pin
38 leash
40 person/user
100 TCU (trailer control unit)
A axis
L lowered position
P pivoting path
P1, P2, P3 positions
R raised position

The invention claimed is:

1. A motor-driven trailer and towbar system for coupling the trailer to a vehicle, comprising:
   a towbar comprising a vehicle side end configured to connect with the vehicle and a trailer side end configured to connect with a trailer coupling of the trailer, wherein the towbar is pivotably coupled to the trailer such that the towbar is configured to pivot along a pivoting path (P) between a lowered position (L) and a raised position (R) with respect to the trailer;
   at least one first sensor element configured to detect a position of the towbar along the pivoting path (P); and
   a control unit (TCU) in communication with the at least one first sensor element, wherein the control unit (TCU) is configured to switch the system between an operating mode where a motor of the trailer supports a movement of the trailer and in a parking mode where brakes of the trailer are applied to impede movement of the trailer depending on a position of the towbar,
   wherein the system is switched into the parking mode when the towbar is in a raised position (R) and wherein the system is switched into the operating mode when the towbar is in a lowered position (L).

2. The system of claim 1, wherein the control unit (TCU) is configured to apply the brakes of the trailer when the towbar moves upwards towards the raised position (R).

3. The system of claim 2, wherein the control unit (TCU) is configured to increase a braking force of the brakes of the trailer as the towbar approaches the raised position (R).

4. The system of claim 1, wherein the control unit (TCU) is further configured to switch to an emergency mode when the towbar moves downwards from the lowered position (L) along the pivoting path (P), where in the emergency mode, the brakes of the trailer are applied at full braking force to achieve an emergency stop.

5. The system of claim 4, wherein the system is switched into the emergency mode when the towbar moves downwards from the lowered position (L) along the pivoting path (P) with a movement speed higher than or equal to a set speed limit.

6. The system of claim 1, wherein the first sensor element comprises one or more of:
   (i) a proximity sensor; (ii) an angular sensor; (iii) an angular encoder; and (iv) a switch.

7. The system of claim 1, wherein the first sensor element comprises a proximity sensor and a counterpart, wherein the proximity sensor is configured to detect a distance between the proximity sensor and the counterpart, and wherein the proximity sensor is positioned at the trailer side end of the towbar and the counterpart is positioned opposite the proximity sensor at the trailer coupling of the trailer.

8. The system of claim 1, wherein the first sensor element comprises a proximity sensor and a counterpart, wherein the proximity sensor is configured to detect a distance between the proximity sensor and the counterpart, and wherein the counterpart is positioned at the trailer side end of the towbar and the proximity sensor is positioned opposite the counterpart at the trailer coupling of the trailer.

9. The system of claim 1, wherein the at least one first sensor element is configured to provide different sensor outputs when the towbar moves along the pivoting path (P).

10. The system of claim 1, wherein the trailer further comprises at least one second sensor element configured to detect whether a connection of the vehicle side end of the towbar with the vehicle has been established.

11. The system of claim 10, wherein the control unit (TCU) is configured to switch the system into a handcart mode when the at least one second sensor element fails to detect the connection to the vehicle, and wherein the control unit (TCU) limits a maximum speed of the trailer to a first speed limit when the system is switched to the handcart mode.

12. The system of claim 11, wherein the control unit (TCU) is configured to switch the system into a vehicle mode when the at least one second sensor element detects the connection to the vehicle, and wherein the control unit (TCU) limits the maximum speed of the trailer to a second speed limit when the system is switched to the vehicle mode.

13. The system of claim 12, wherein the second speed limit is higher than the first speed limit.

14. The system of claim 10, wherein the at least one second sensor element is configured to detect whether a safety pin of a vehicle coupling of the vehicle is inserted into a respective receptacle of the vehicle side end of the towbar.

15. The system of claim 14, wherein the control unit (TCU) is further configured to switch the system into an emergency mode when the connection between the towbar and the vehicle is lost, wherein the brakes of the trailer are applied at full braking force to achieve an emergency stop when the system is switched into the emergency mode.

* * * * *